July 31, 1945.  R. E. HOLDMAN  2,380,436
LEVEL INDICATOR AND RECORDER FOR MOLTEN GLASS
Filed June 19, 1944  3 Sheets-Sheet 1
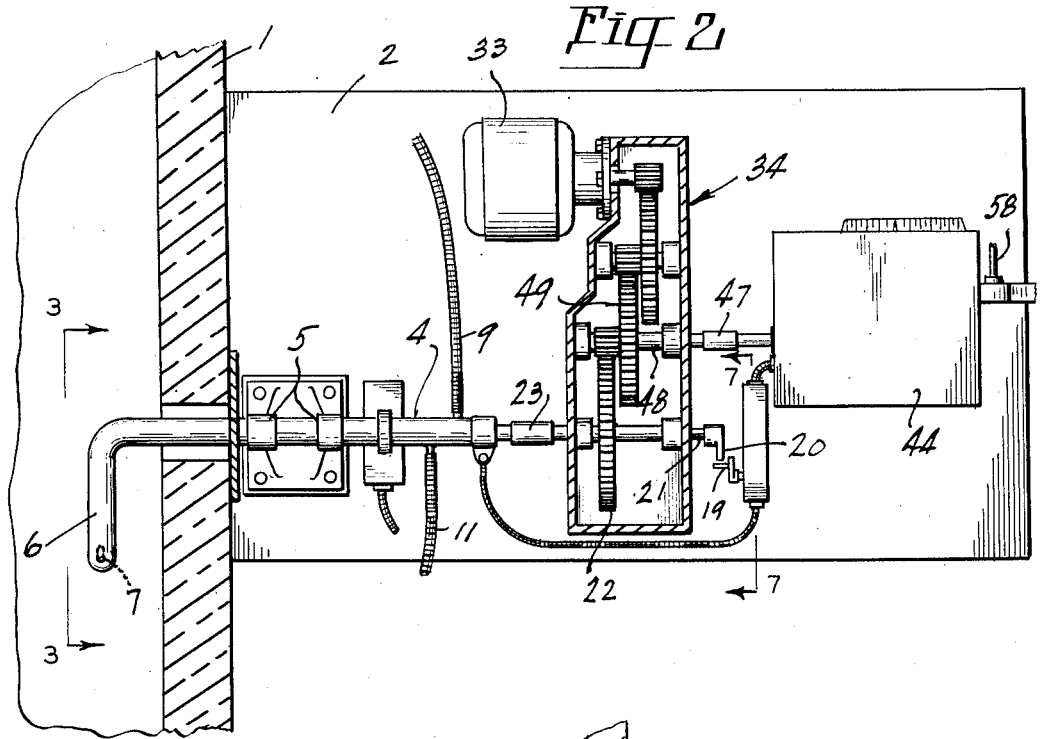
Fig 2
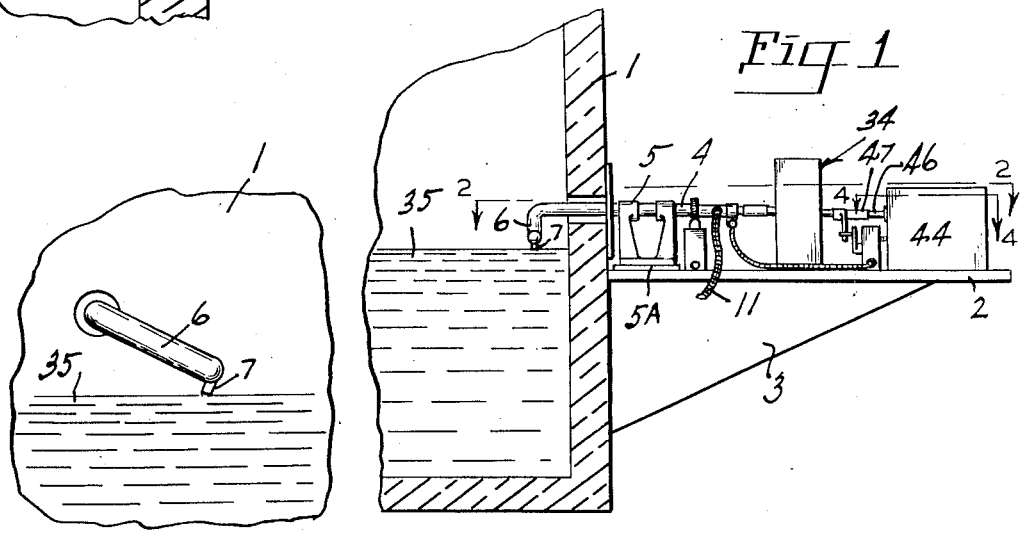
Fig 1
Fig 3
ROBERT ELLSWORTH HOLDMAN
INVENTOR
BY James L. Ginnan
ATTORNEY

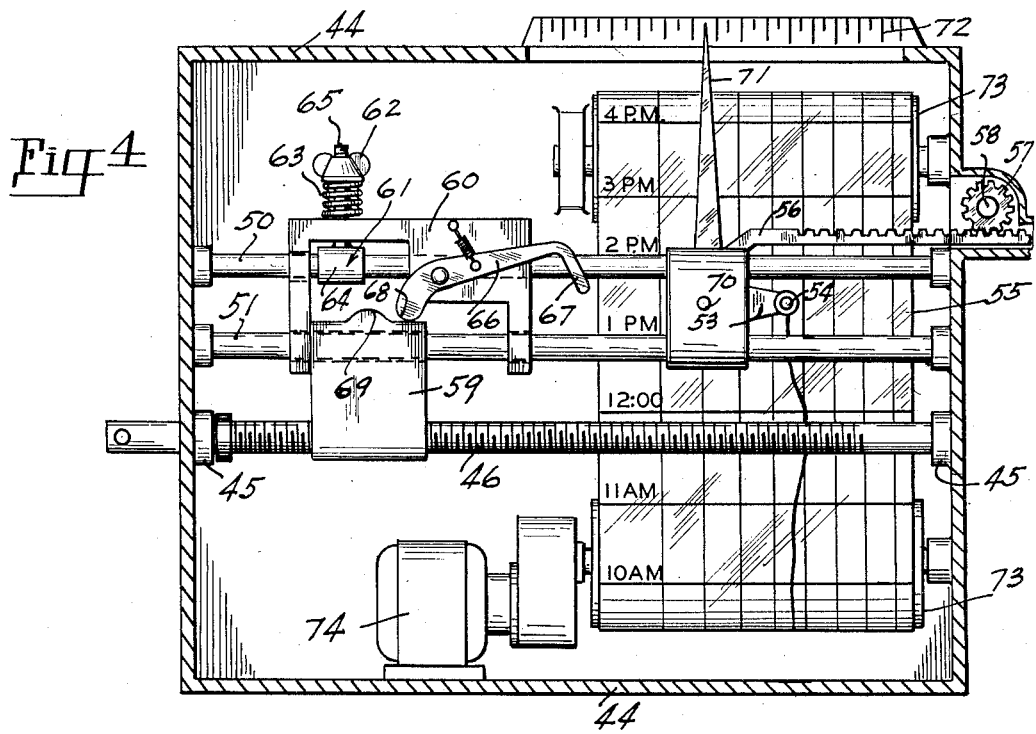
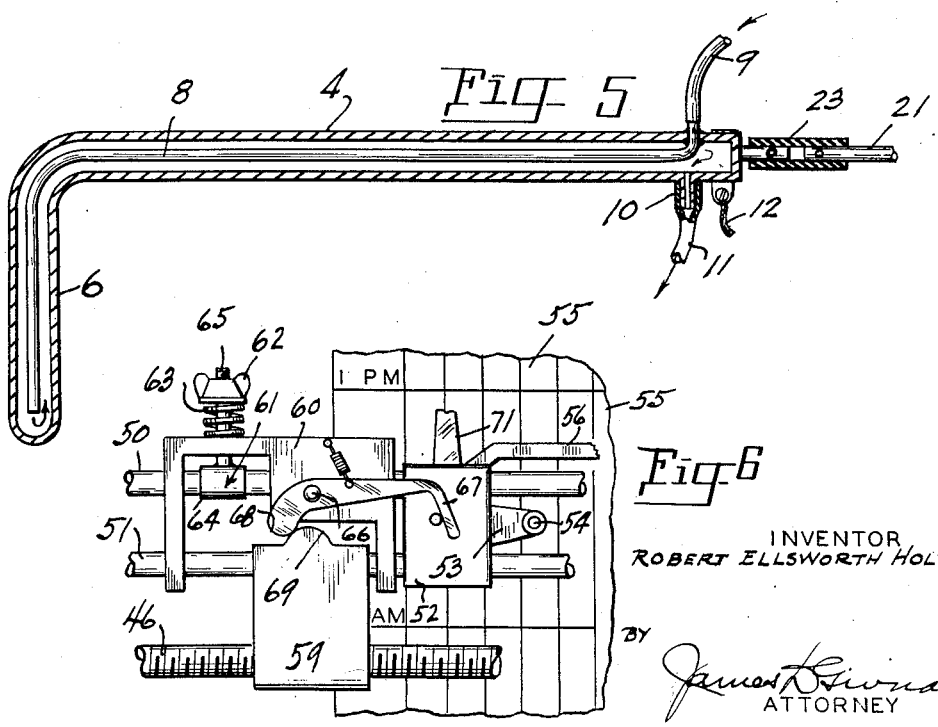

July 31, 1945.   R. E. HOLDMAN   2,380,436
LEVEL INDICATOR AND RECORDER FOR MOLTEN GLASS
Filed June 19, 1944   3 Sheets-Sheet 3

ROBERT ELLSWORTH HOLDMAN
INVENTOR

BY *James L. Givnan*
ATTORNEY

Patented July 31, 1945

2,380,436

UNITED STATES PATENT OFFICE 2,380,436

LEVEL INDICATOR AND RECORDER FOR MOLTEN GLASS

Robert Ellsworth Holdman, Portland, Oreg.

Application June 19, 1944, Serial No. 541,066

3 Claims. (Cl. 73—290)

This invention relates to improvements in apparatus for indicating and recording variations in the level of molten glass in a melting tank.

It is one of the principal objects of this invention to provide apparatus of this character which is of such sensitivity that it will be actuated by, and caused to record, variations in the level of the molten glass within the tank down to one one-hundredths (1/100) of an inch, and is adaptable for adjustment to indicate and record levels of other fluids or molten material in tanks or vats.

The foregoing and other objects will appear as my invention is more fully hereinafter described in the following specification illustrated in the accompanying drawings, and finally pointed out in the appended claims.

In the drawings:

Figure 1 is a side elevation of the device operatively connected with a tank which is fragmentarily shown.

Figure 2 is an enlarged top plan view of Figure 1.

Figure 3 is a detail view of an arm, taken along the line 3—3 of Figure 2, actuated by the apparatus and adapted to intermittently contact the surface of the molten glass within the tank to make and break an electrical circuit.

Figure 4 is an enlarged sectional front elevation of a portion of Figure 2.

Figure 5 is an enlarged longitudinal sectional view of the rotatable arm described in connection with Figure 3.

Figure 6 is a fragmentary front elevation of Figure 4 showing certain of the parts at one end of their range of operation.

Figure 7:
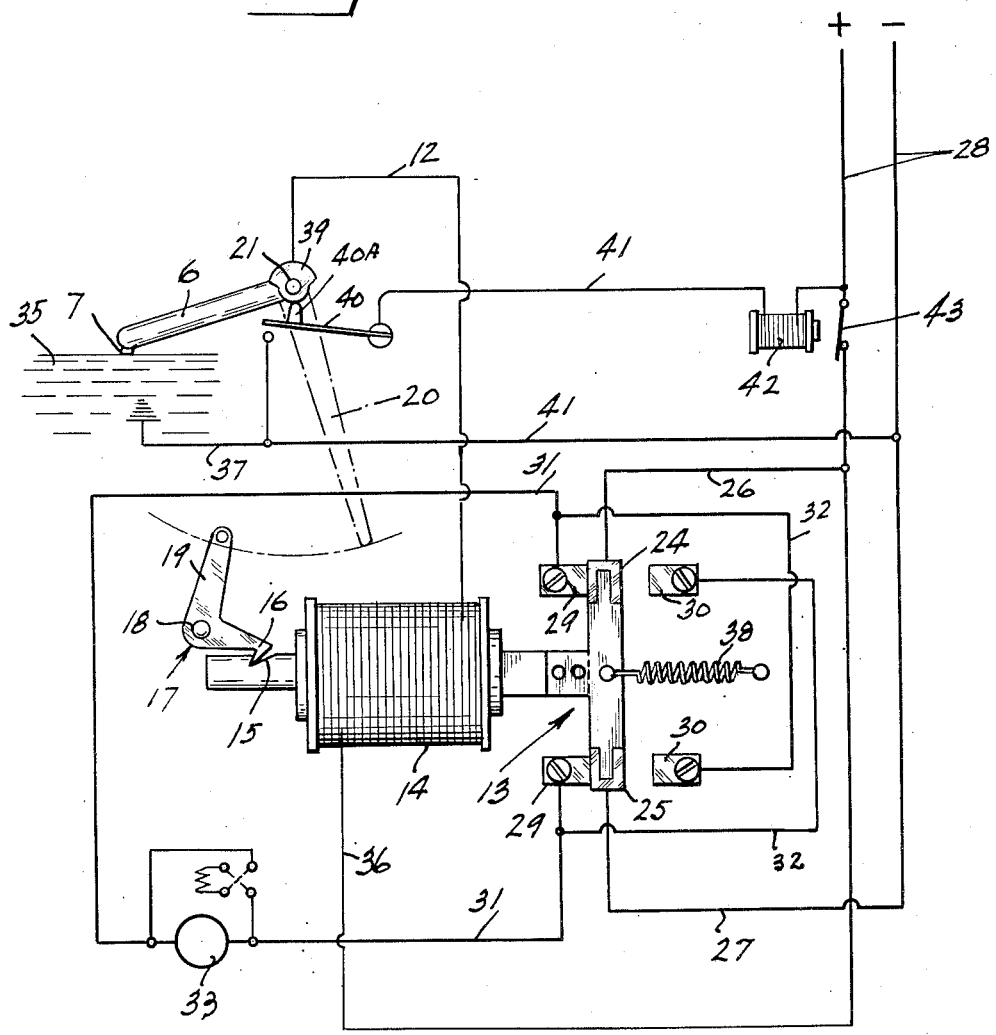
Figure 7 is a diagrammatic layout of certain electrical elements of the invention operatively embraced within electrical circuits.

Referring now more particularly to the drawings:

Reference numeral 1 indicates a fragment of a glass-melting tank or vat whose front, rear, bottom end and top walls are formed of refractory material. To one wall of the tank I mount a platform 2 in any approved manner as indicated at 3. Upon the platform I mount a hollow shaft 4 which is rotatable within bearings 5 insulated as at 5A from their support. The shaft extends into the tank through a suitable aperture 5B and its inner end is turned at right angles to itself as at 6 and provided with an electrical contact 7 preferably made of platinum. For cooling purposes, I provide the interior of the shaft with a water conduit 8 supplied with water through a flexible hose 9 connected with any convenient source of supply. The conduit is open at its outermost end to admit water to the interior of the shaft which drains out at the opposite end thereof through an outlet 10 connected with a drainage hose 11. Thus the interior of the shaft receivers a constant flow of cooling water so that the portion 6 of the shaft and the contact carried thereby are enabled to withstand the high temperatures of the heat within the tank. The shaft 4 is electrically connected by a wire 12 with a relay switch generally indicated at 13 (see Figure 7) which consists of a solenoid 14 whose core at one end is notched as at 15 for periodic engagement with a hook 16 formed on one leg of a bell-crank 17 pivotally mounted as at 18. The other leg 19 of the bell-crank is disposed in the path of movement of an arm 20 carried by a shaft 21 of a driven gear 22 of a gear train to be more fully hereinafter described. The shaft 21 is connected to the hollow shaft 4 and rotates the same through a coupling 23 made of insulating material to insulate the charged shaft 4 from the shaft 21 and its related parts.

The opposite end of the core of the solenoid 14 terminates in a switch arm made of insulating material and whose outermost ends are provided with metallic contacts 24 and 25 connected by wires 26 and 27 respectively with both sides of a power line 28. Two pairs of contacts 29 and 30 are connected by wires 31 and 32 respectively with any approved type motor indicated at 33 and reversible by change of polarity. This motor is operatively connected with the gear transmission 34 within which is included and finally driven by the motor 33 the previously mentioned gear 22. From the foregoing it will be apparent that when the motor 33 is operating in one direction, the hollow shaft 4 will be rotated to swing its portion 6 upwardly to remove the contact 7 out of contact with the molten glass as indicated at 35, and when the motor operates in an opposite direction it returns the contact 7 of the shaft 4 into contact with the glass.

The solenoid 14 is connected to one side of the line 28 by a wire 36 and to the opposite side of the line by the wire 12, hollow shaft 4 and its extension 6, the contact 7 and the ground connection 37. With the parts in the positions shown in Figure 7 the circuit is closed through the solenoid by the contacts 7, the molten glass 35, and the ground connection 37 which draws the contacts 24 and 25 against the contacts 29 to close the motor circuit to cause it to operate in a direction to lift the arm 6 and contact 7 upwardly and out of contact with the glass 35. This rotation of the shaft 4 causes the arm 20 to strike the leg 19 of the bell-crank 17 to disengage the hook portion 16 thereof from the notch 15 in the core of the solenoid. When the core is thus released a tension spring 38 pulls the contacts 24 and 25 away from the contacts 29 and into engagement with the opposite contacts 30 which closes the circuit to the motor through the wires 32 and 31 to cause the motor to operate in an opposite direction which lowers the portion 6 of the shaft 4 and the contact 7 into electrical contact with the molten glass. Thus it will be seen that the contact 7 intermittently and at periodic intervals goes into and out of contact with the level of the glass in the tank to close the circuits as above outlined and to operate the motor 33, first, in one direction and then in another. In the event that the level of the glass should accidentally rise to a dangerous level or to a point where it would contact the horizontal portion of the shaft 4, I provide an automatic cut-out switch consisting of a cam 39 attached to and rotatable with the shaft 4 so that if the portion 6 of the shaft should swing upwardly to an excessive angle the lobe of the cam would press downwardly on a switch blade 40 through a piece of insulating material 40A to close a circuit 41 to energize a relay 42 to open a main switch 43 in the power line 28. Opening of this switch of course would render the entire system inoperative until proper correction or adjustment of the glass feeding mechanism had been attended to.

The indicating and recording portion of the apparatus consists of a housing 44 within which is rotatably mounted by means of bearings 45, a screw shaft 46 which extends outwardly from one end wall of the housing and engages by means of a coupling 47 with a shaft 48 which is driven first in one direction and then in another by means of one of the driven gears 49 in the gear transmission 34 driven by the reversible motor 33. Fixedly mounted within the housing 44 are two horizontal parallel shafts 50 and 51 upon which is slidably mounted a block 52 having an arm 53 extending outwardly therefrom and provided with an inwardly extending stylus 54 adapted to record on a movable chart 55 any movement of the block 52 to the right or left of its normal position or its last position of repose determined by the movement of certain of its related parts hereinafter referred to. The block 52 is provided with a gear rack 56 engaged with and adapted to rotate a gear 57 secured to a shaft 58 which extends outwardly through the housing and which may serve as a power-takeoff for any desired purpose. Slidably mounted on the lower shaft 51 is a follower block 59 which is threadedly engaged with the screw shaft 46 and movable therealong by rotation of the screw shaft.

Slidably mounted upon both the shafts 50 and 51 is a yoke 60 whose freedom of movement along said shafts is regulated by a spring actuated drag 61 which may be regulated by a thumbnut 62 working against a compression spring 63 whose one end bears beneath the wing-nut and whose opposite end bears against the top surface of the yoke to apply tension to the collar 64 embracing the shaft 50. The more the thumb-nut is advanced downwardly upon its bolt 65 the more friction is created between the collar 64 and the shaft 50. The adjustable drag 61 performs the necessary function of stabilizing the yoke so that it will remain stationary during the time the cam portion 67 of the arm 66 moves downwardly over a pin 70 in the block 52 as the cam draws block 52 and its associated indicating and/or recording means toward the right leg of the yoke. The yoke is also held immovable by the drag during the entire travel of block 59 from either leg of the yoke to the other.

The resistance of the drag 61 is such that although it will render the yoke immovable as aforesaid, it will allow the yoke to readily yield to the pushing action of the screw-driven block 59. To the yoke 60 I pivotally mount an arm 66 whose outermost end is formed with a hook portion 67 and whose opposite or inner end is formed into a cam surface 68 adapted to cooperate with and be actuated by a cam surface 69 formed on the upper surface of the traveler block 59.

Thus at the beginning of the cycle, as the traveler block 59, due to the rotation of the screw shaft 46, moves to the right as viewed in Figure 4 out of contact with the left leg of the yoke and toward contact with the right leg thereof, the cam portion 69 will swing the cam portion 67 of the arm 66 downwardly through a certain angle then back to its original position. The block 59 has now contacted the right hand leg of the yoke 60, arm 66 being in the same position as shown in Figure 4 (i. e. at the same position as at the beginning of the measuring cycle). The yoke 60 and the block 59 now move to the right in fixed relative position, until the moment that contact 7 makes electrical contact with the surface of the molten glass. At this moment the motor 33 is reversed and therefore shaft 46 is likewise reversed. Thus as the traveler block, due to the rotation of the screw shaft 46, moves to the left as viewed in Figure 6 out of contact with the right leg of the yoke and toward contact with the left leg thereof, the cam portion 69 of the block will swing the cam portion 67 of the arm 66 downwardly to slidably engage with a pin 70 extending outwardly from the block 52 of the indicating mechanism. If the level of the molten glass has not changed since the previous contact of the shaft 4 with the glass the right leg of the yoke 60 will come into contact with the left-hand wall of the block 52 at the moment the contact with the glass is made which will enable the cam portion 67 of the arm 66 to freely settle down over the pin 70 and to be lifted away from it without disturbing the setting of the block 52. If, however, the level of the molten glass has changed and the yoke does not quite contact the block 52, the cam portion 67 of the arm 66 will contact the pin 70 and upon its further downward movement will draw the block to the left as viewed in Figure 6 so that the lefthand wall of the block 52 will be drawn up against the right leg of the yoke 60. This movement of the block of course moves indicating arm 71 to the left to indicate upon a scale 72 the amount of such movement. If an opposite change in the level of the molten glass occurs, the right leg of the yoke 60 will contact the left wall of the block 52 and move it to the right which will cause the indicating arm 71 to indicate this change in level in the opposite direction. In this case as in the case where the level of the molten glass has not changed, as the block 59 moves to the left, as viewed in Figure 6, out of contact with the right leg of the yoke and toward contact with the left leg thereof, the cam portion 69 will swing the cam portion 67 of the arm 66 downwardly to freely settle over the pin 70 and to be lifted away from it without disturbing the setting that existed at the moment contact with the glass surface was made. The block 59 continues to move to the left and at the moment the left-hand face of said block 59 moves into contact with the left-hand leg of yoke 60, the cam portion 67 of the arm 66 being in such a position that it clears pin 70, the block and the yoke move to the left with relative positions as shown in Figure 4 until the arm 20 carried by shaft 21 strikes the leg 19 of the bell crank 17 which causes the motor to operate in an opposite direction thereby completing the cycle. It is to be understood that the cam portion 67 of the arm 66 at no time comes into hooked engagement with the pin 70. The action between the two is merely that of a cam. The downward swing of the arm 66 caused by the cam surfaces 68 and 69 causes the downward movement of the cam portion 67 of the arm 66 to draw the indicator block toward the yoke 60.

The movable chart 55 embraces and is driven by a pair of drums 73 one of which is driven by a synchronous motor 74. The chart is provided with transverse graduations each indicating successive hours of the day and night as shown, and the speed of travel of the chart is such that it requires one hour to move the distance from one graduation to the next with respect to the stylus 54. Thus I provide a permanent record of changes in the level of the glass over any desired period of time.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. In apparatus for indicating and/or recording fluid levels in a tank comprising means for intermittently contacting the fluid to close an electric circuit embracing and for operating a reversible motor, the combination of a traveler block movable in two directions by the operation of said motor, a traveling yoke embracing said block and movable thereby at certain limits of movement of the block, indicating and/or recording means slidably mounted in the path of movement of the yoke to be moved thereby in one direction, and means for interconnecting the yoke and said indicating and/or recording means for movement in the opposite direction.

2. In apparatus for indicating and/or recording fluid levels in a tank comprising means for intermittently contacting the fluid to close an electric circuit embracing and for operating a reversible motor, the combination of a traveler block movable in two directions by the operation of said motor, a traveling yoke embracing said block and movable thereby at certain limits of movement of the block, indicating and/or recording means slidably mounted in the path of movement of the yoke to be moved thereby in one direction, and means for interconnecting the yoke and said indicating and/or recording means for movement in the opposite direction, said means including a projection carried by the indicating and/or recording means, and means pivotally mounted to the yoke and movable into and out of cammed engagement with said projection by movement of said traveler block with respect to the yoke.

3. In apparatus for indicating and/or recording fluid levels in a tank comprising means for intermittently contacting the fluid to close an electric circuit embracing and for operating a reversible motor, the combination of a traveler block movable in two directions by the operation of said motor, a traveling yoke embracing said block and movable thereby at certain limits of movement of the block, indicating and/or recording means movable by the yoke in one direction, cam means actuated by the block for moving said indicating and/or recording means in an opposite direction, and means carried by the yoke for stabilizing itself during the cam action in moving the indicating and/or recording means in said opposite direction.

ROBERT ELLSWORTH HOLDMAN.